US011146733B1

(12) United States Patent
Trinh et al.

(10) Patent No.: US 11,146,733 B1
(45) Date of Patent: Oct. 12, 2021

(54) CARGO MANAGEMENT SYSTEM AND METHODS

(71) Applicant: AMERICAN AIRLINES, INC., Fort Worth, TX (US)

(72) Inventors: Korina Trinh, Euless, TX (US); Venkata Chandra Sekhar Mandala, Euless, TX (US); Spencer Kaiser, Dallas, TX (US); Vijay Punnam, Plano, TX (US); Kyle Lloyd, Austin, TX (US); Charles Albright, Farmers Branch, TX (US); Ashok Punnam, Irving, TX (US); Jack Stephen Daniel, Fort Worth, TX (US); Vikram Kurri, Frisco, TX (US); Rajesh Subramaniam, Frisco, TX (US)

(73) Assignee: American Airlines, Inc., Fort Worth, TX (US)

( * ) Notice: Subject to any disclaimer, the term of this patent is extended or adjusted under 35 U.S.C. 154(b) by 0 days.

(21) Appl. No.: 16/542,503

(22) Filed: Aug. 16, 2019

(51) Int. Cl.
| | |
|---|---|
| *H04N 5/232* | (2006.01) |
| *G06F 3/0488* | (2013.01) |
| *G06Q 10/08* | (2012.01) |
| *G06F 16/583* | (2019.01) |
| *G06F 16/587* | (2019.01) |
| *G06F 3/0482* | (2013.01) |

(52) U.S. Cl.
CPC ..... *H04N 5/232935* (2018.08); *G06F 3/0482* (2013.01); *G06F 3/04883* (2013.01); *G06F 16/587* (2019.01); *G06F 16/5846* (2019.01); *G06Q 10/0833* (2013.01)

(58) Field of Classification Search
CPC ............ H04N 5/232935; G06F 3/0482; G06F 16/587; G06F 3/04883; G06F 16/5846; G06Q 10/0833
See application file for complete search history.

(56) References Cited

U.S. PATENT DOCUMENTS

| | | | | |
|---|---|---|---|---|
| 2016/0378877 | A1* | 12/2016 | Khemka | G06F 16/9554 235/375 |
| 2018/0314849 | A1* | 11/2018 | Maisonneuve | G06F 21/606 |
| 2019/0039098 | A1* | 2/2019 | Berger | B07C 3/14 |
| 2019/0095744 | A1* | 3/2019 | Hager | G06Q 10/08 |
| 2019/0354919 | A1* | 11/2019 | Mahboob | G06F 40/295 |
| 2020/0290089 | A1* | 9/2020 | Blohm | B07C 3/14 |

* cited by examiner

*Primary Examiner* — Shahbaz Nazrul
(74) *Attorney, Agent, or Firm* — Haynes and Boone, LLP

(57) ABSTRACT

A method of matching a found item record with an existing item record, wherein the found item record includes a plurality of record fields. In an example embodiment, the found item is a piece of cargo that is associated with a travel route. In an example embodiment, the method includes: receiving, by one or more processors and from a remote user device, a photo file that comprises an image of the found item; generating, based on the image and using an image to image-description application, text describing an appearance of the found item; storing the generated text describing the appearance of the found item in a first record field from the plurality of record fields; and comparing the text within the first record field with text within a first record field in the existing item record to match the found item record with the existing item record.

22 Claims, 8 Drawing Sheets excellent# CARGO MANAGEMENT SYSTEM AND METHODS

BACKGROUND

Generally, cargo follows a travel route and is transported from an origination location and to an arrival destination. Generally, a cargo identifier or shipping label is coupled to the cargo to provide details as to the arrival destination and/or travel route to the arrival destination. Other cargo identifying information may be provided on the cargo identifier such as the identity of the shipper, the name of the recipient, etc. Often, cargo is misplaced or lost during the travel process and is left at an untracked or unknown location. In some cases, the cargo identifier is damaged such that the arrival destination and/or other cargo identifying information is not recognizable or scannable. Without the cargo identifier or shipping label to provide the arrival destination, the cargo is often stored or otherwise placed in a holding location. In some embodiments, the storage or placement of the cargo in the holding location is intentional, but in other embodiments the storage or placement of the cargo in the holding location is accidental (e.g., the cargo falls off a conveyor and lands in the holding location).

Cargo carriers, such as airlines, often create an electronic database that includes records of found or reported cargo that has been apparently misplaced. Generally, the cargo carriers rely on employees or other personnel to update the electronic database. With conventional technology, however, the electronic database does not have required fields for each record, so there is no control over the quality of the electronic data submitted. Thus, a team must consciously check the database for new additions of found cargo and match the found cargo records with existing cargo records, which includes missing cargo records and other cargo records. That is, there is no automatic matching of found cargo records to existing cargo records. The usability of the electronic database is also dependent upon each description of the found cargo being relevant and sufficiently unique to distinguish the found cargo from another piece of found cargo. Often, the records are lacking necessary information to identify the found cargo. Due to the time required to match found cargo records with existing cargo records using the electronic database, there is little incentive for a user or employee to access the electronic database. Moreover, using conventional methods, any photos taken of the found cargo are saved in a camera or computing device prior to uploading or saving to the electronic database. Additionally, there is generally no traceability when an issue (i.e., found misplaced cargo or reported missing cargo) is reported using conventional methods.

DETAILED DESCRIPTION

In some embodiments, a cargo management system includes a cargo management application designed to assist with the identification of found cargo that does not have a cargo identifier applied or have a damaged cargo identifier applied. In some embodiments, the cargo management application will allow users to submit photos of the found cargo, submit photos of any labels present on the misplaced cargo, and/or submit other pertinent information to the cargo management application so that the cargo management application can match the found cargo with an existing cargo record. In some embodiments, the cargo management application uses optical character recognition to extract text and cross-reference the text to targeted fields within an electronic database listing missing and/or other cargo. If a match is found, notification will be made to the user and centralized tracing team so that the necessary action may be taken.

Figure 1:
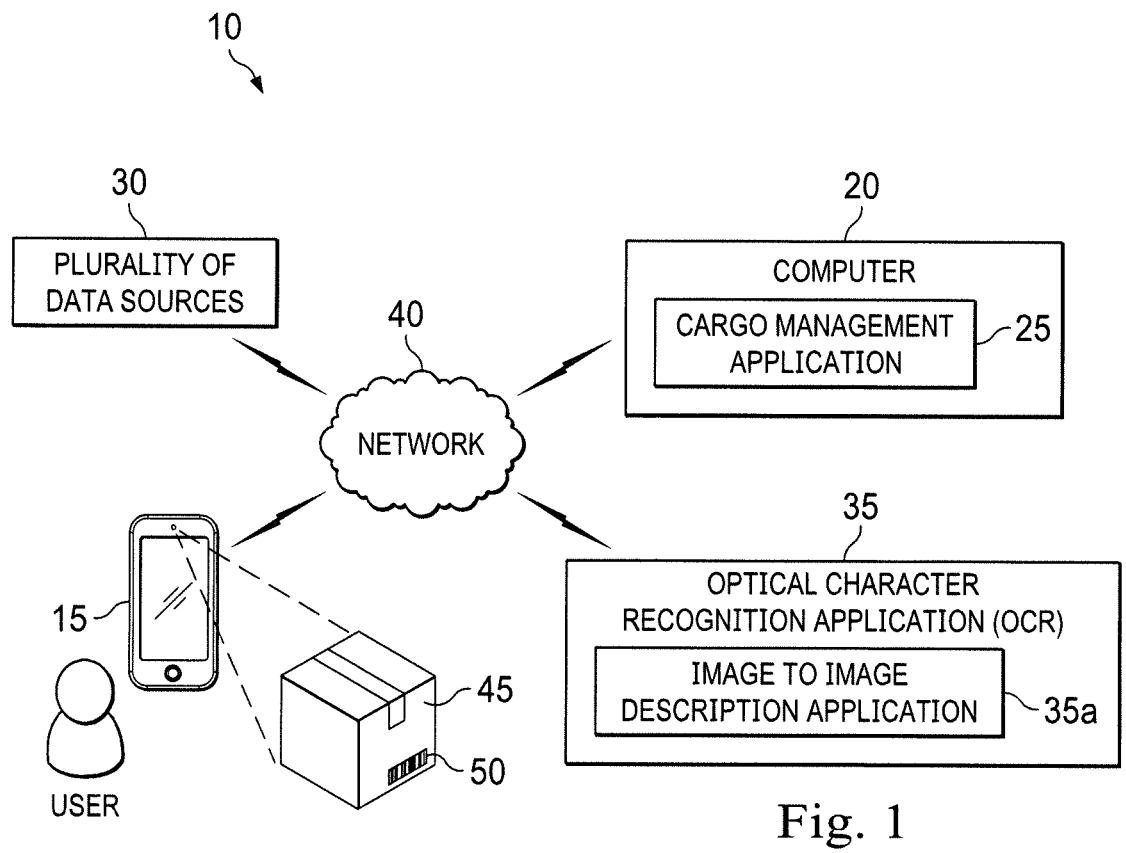
FIG. 1 is a diagrammatic illustration of a cargo management system according to an example embodiment, the system including a remote user device comprising a graphical user interface ("GUI") that is configured to display a plurality of windows.

In an example embodiment, referring to FIG. 1, the cargo management system is illustrated and designated by the numeral 10. In an example embodiment, the cargo management system 10 includes a remote user device 15, a computer 20 within which a cargo management application 25 is stored, a plurality of data sources 30, and an optical character recognition ("OCR") application 35 (company developer, in-house developed, or 3rd party integration) which are in communication via a network 40. Generally, when a user finds lost or misplaced cargo 45 (i.e., found cargo), the user takes a picture of the cargo 45 using the remote user device 15 via the cargo management application 25. The OCR application 35 recognizes text within the picture and provides a description of the cargo 45 based on the picture. The description is then compared against a listing of missing cargo and/or a listing of existing cargo records. In some embodiments, each piece of missing cargo is associated with a missing cargo record that provides information regarding the missing cargo, and the cargo management application 25 matches the missing cargo records with found cargo records generated by the application 25. Generally, the system 10 matches the found cargo 45 with an existing cargo record, provides instructions to the user on how to process the found cargo 45, and tracks the reporting, matching, and other activities relating to the cargo 45. In some embodiments, a cargo identifier 50 is coupled to the cargo 45, but in other embodiments there is no cargo identifier 50 coupled to the cargo 45.

Figure 2:
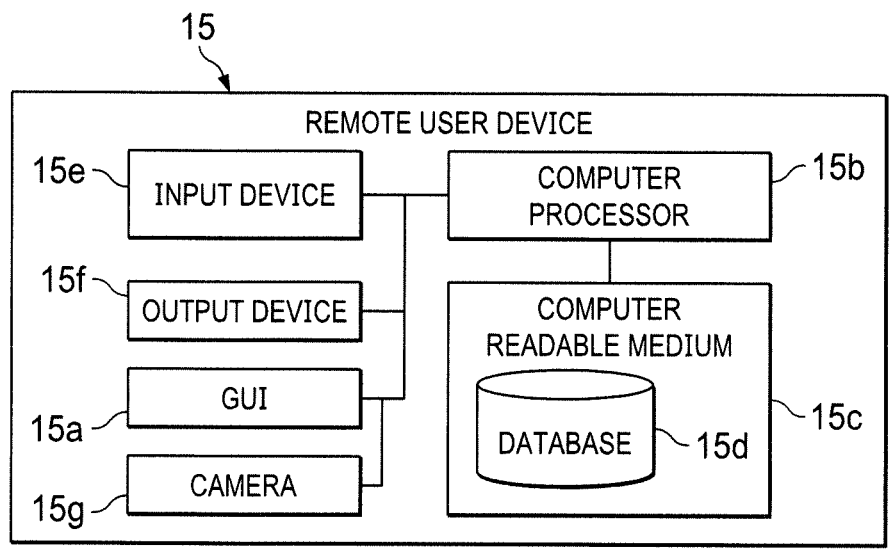
FIG. 2 is a diagrammatic illustration of the remote user device of FIG. 1, according to an example embodiment.

In an example embodiment, as illustrated in FIG. 2 with continuing reference to FIG. 1, the remote user device 15 includes a GUI 15*a*, computer processor 15*b* and a computer readable medium 15*c* operably coupled thereto. Instructions accessible to, and executable by, the computer processor 15*b* are stored on the computer readable medium 15*c*. A database 15*d* is also stored in the computer readable medium 15*c*. Generally, the GUI 15*a* can display a plurality of windows or screens to the user. The remote user device 15 also includes an input device 15*e* and an output device 15*f*. In some embodiments, the input device 15*e* and the output device 15*f* are the GUI 15*a*. In some embodiments, the user provides inputs to the system 10 via a window that is displayed on the GUI 15*a*. However, the input device 15*e* can also be a microphone in some embodiments and the output device 15*f* is a speaker. In several example embodiments, the remote user device 15 is, or includes, a telephone, a personal computer, a personal digital assistant, a cellular telephone or mobile phone, other types of telecommunications devices, other types of computing devices, and/or any combination thereof. In several example embodiments, the remote user device 15 includes a plurality of remote user devices.

In some embodiments and referring back to FIG. 1, the computer 20 is similar to the remote user device 15 in that the computer 20 also includes a computer processor and a computer readable medium operably coupled thereto. Instructions accessible to, and executable by, the computer processor are stored on the computer readable medium. A database is also stored in the computer readable medium of the computer 20.

In one or more example embodiments, the cargo management application 25 is stored in the computer readable medium of the computer 20 and/or in the computer readable medium 15*c* of the remote user device 15. In some embodiments, the cargo management application 25 is a mobile application developed in the iOS platform. In some embodiments, the cargo management application 25 includes and/or executes one or more web-based programs, Intranet-based programs, and/or any combination thereof. In an example embodiment, the cargo management application 25 includes a computer program including a plurality of instructions, data, and/or any combination thereof. In an example embodiment, the application is written in, for example, HyperText Markup Language (HTML), Cascading Style Sheets (CSS), JavaScript, Extensible Markup Language (XML), asynchronous JavaScript and XML (Ajax), iOS, xCode, Swift, Android for mobile, and/or any combination thereof. In an example embodiment, the cargo management application 25 is a web-based application written in, for example, Java or Adobe Flex, which pulls real-time information from the remote user device 15, the computer 20, and/or the plurality of data sources 30. In an example embodiment, the cargo management application 25 pulls real-time information from the plurality of data sources 30, upon the execution, opening or start-up of the cargo management application 25. In some embodiments, the cargo management application 25 is or includes a mobile application downloaded on the remote user device 15 of the user. In some embodiments, the cargo management application 25 accesses the camera 15*g*, microphone, and/or speaker of the remote user device 15.

In one embodiment, the plurality of data sources 30 includes a database that includes a listing of existing cargo, which includes a listing of all cargo in transit (i.e., not yet reached its final destination) regardless of whether the cargo has been flagged as missing, and a listing of all reported missing cargo. In some embodiments, the listing of all cargo in transit is an airwaybill database. In some embodiments, the airwaybill database forms a portion of the plurality of data sources 30 and/or a portion of the computer 20. In some embodiments, the airwaybill database includes a plurality of records, with each record including a record field for one or more of the following: origination location, shipper, company name, consignee, final destination, size of cargo, departure date from origination location, expected arrival date/time for the final destination, shape of cargo, color of cargo, and/or tracking or other shipping information, such as an airway bill number, relating to or affixed to the cargo.

In an example embodiment, the OCR application 35 accesses information, such as an image, sent from the remote user device 15 via the application 25. In some embodiments, the OCR application 35 receives the image and identifies or extracts text depicted in the image. In some embodiments, the OCR application 35 receives an image in base 64 format, PNG format, TIF format, or JPG file format among others and converts a picture or image of text into a text in a computer readable format, such as for example JSON. In some embodiments, the OCR application 35 includes an image to image-description application 35*a*, which receives/accesses the image and identifies or assigns a descriptor of items depicted in the image. That is, the image to image-description application 35*a* can assign a descriptor of "brown box" to an image that include a brown box even without the text "brown box" forming a portion of the image. In some embodiments, the image to image-description application 35*a* recognizes and identifies trademarks, branding, QR codes, etc. In some embodiments, the OCR application 35 is OCR with Google Cloud Vision API by Google of Mountain View, Calif. In some embodiments, the OCR application 35 involves or uses artificial intelligence (AI) to implement more advanced methods of intelligent character recognition (ICR), like identifying languages or styles of handwriting. In some embodiments, the application 35 includes a barcode, QR, or other machine-readable optical label that contains information.

In an example embodiment, the network 40 includes the Internet, one or more local area networks, one or more wide area networks, one or more cellular networks, one or more wireless networks, one or more voice networks, one or more data networks, one or more communication systems, and/or any combination thereof.

In some embodiments, the cargo 45 is freight, load, haul, a shipment, baggage, luggage, mail, etc. In some embodiments, the cargo 45 is a cargo container within with an object is placed but in other embodiments the cargo 45 is the object itself (e.g., in transit without a container).

In some embodiments, the cargo identifier 50 is or includes a shipping or freight label, such as an airwaybill number. In some embodiments, the cargo identifier 50 includes customer information, destination location, and origination location.

Figure 3:
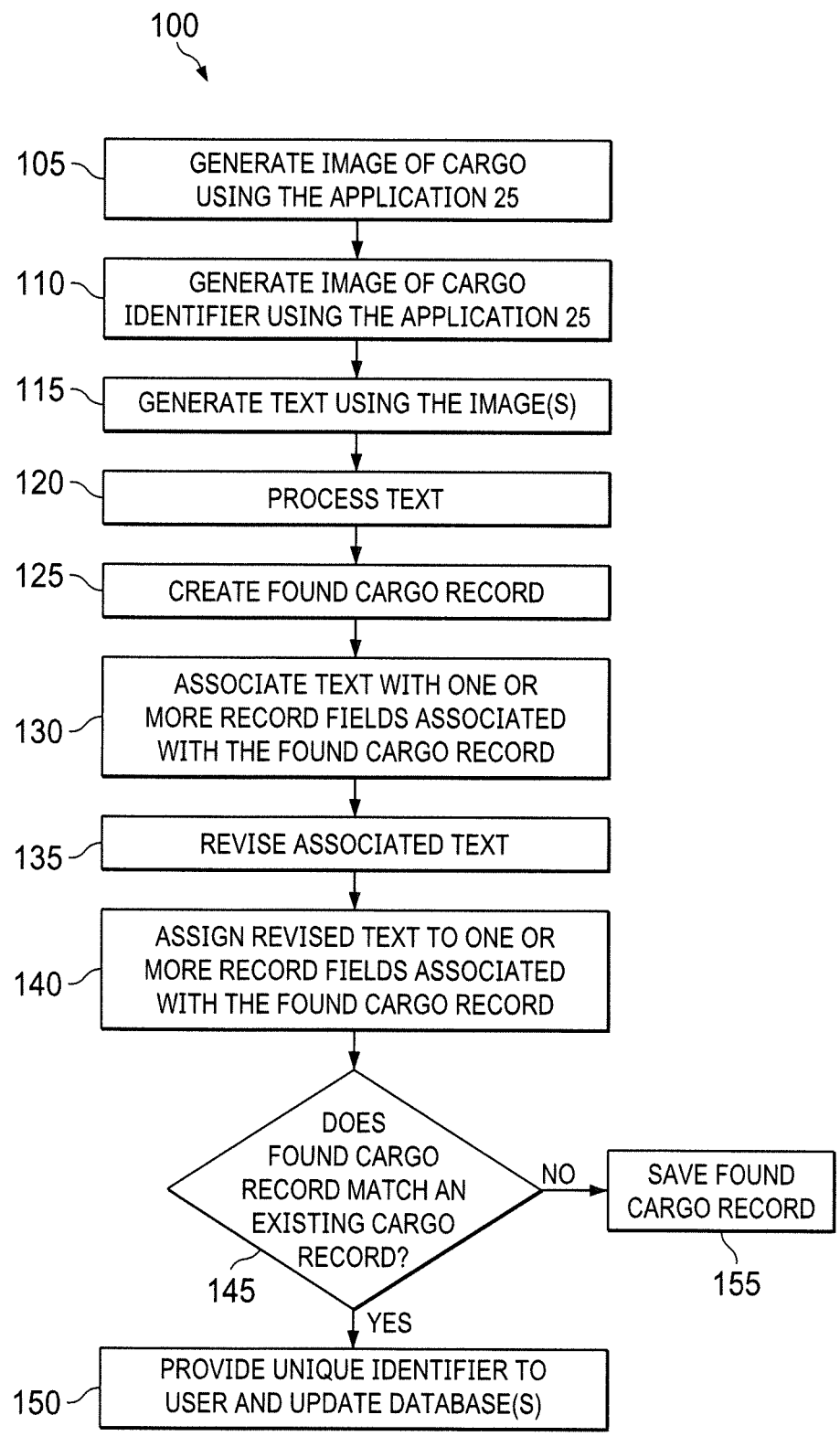
FIG. 3 a flow chart illustration of a method of operating the system of FIGS. 1-2, according to an example embodiment.

In an example embodiment, as illustrated in FIG. 3 with continuing reference to FIGS. 1-2, a method 100 of operating the system 10 includes generating an image of the cargo 45 using the application 25 at step 105; generating an image of the cargo identifier 50 using the application 25 at step 110; generating and/or extracting text using the image(s) at step 115; processing the text at step 120; creating a found cargo record using the processed text at step 125; associating text with one or more record fields associated with the found cargo record at step 130; revising the associated text at step 135; assigning the revised text to one or more record fields associated with the found cargo record at step 140; determining whether the found cargo record matches with an existing cargo record at step 145; if yes, then providing a unique identifier to the user and update database(s) at step 150; and if no, then saving the found cargo record in the database at step 155.

Figure 4:
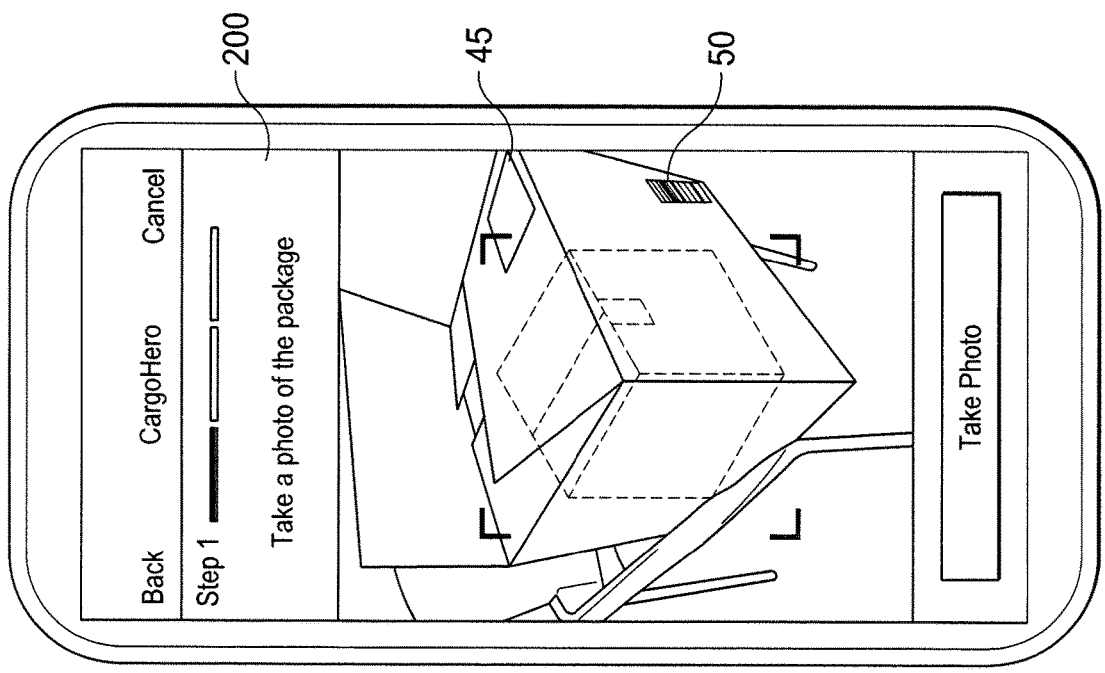
FIG. 4 is an illustration of a window displayed on the GUI of the remote user device of FIG. 1 during a step of the method of FIG. 3, according to an example embodiment.

In an example embodiment and at the step 105, an image of the found cargo 45 is generated using the application 25. As illustrated in FIG. 4, the application 25 displays a screen 200 on the GUI 15a of the remote user device 15, with the screen 200 including instructions to take a photo of the cargo 45, a preview of the image, and selectable button that instructs the camera 25g to capture or generate the image. In some embodiments, the application 25 accesses the camera 15g such that opening the application 25 automatically activates the camera 15g. In some embodiments, the camera 15g is activated by the application 25 after the user indicates that he or she wants to report found cargo. At the step 105, the selection of the selectable button instructs the application 25 to creates a photo file that includes the image of the cargo 45. In one embodiment, the image generated at the step 105 includes a perspective view or a view of the entirety of the cargo 45. However, in other embodiments, the image generated at the step 105 includes only a portion of the cargo 45. In some embodiments, the photo file(s) include metadata relating to: the user that logged into the application 25 from which the photo file(s) were sent, a time stamp, location data (e.g., GPS coordinates), etc.

Figure 5:
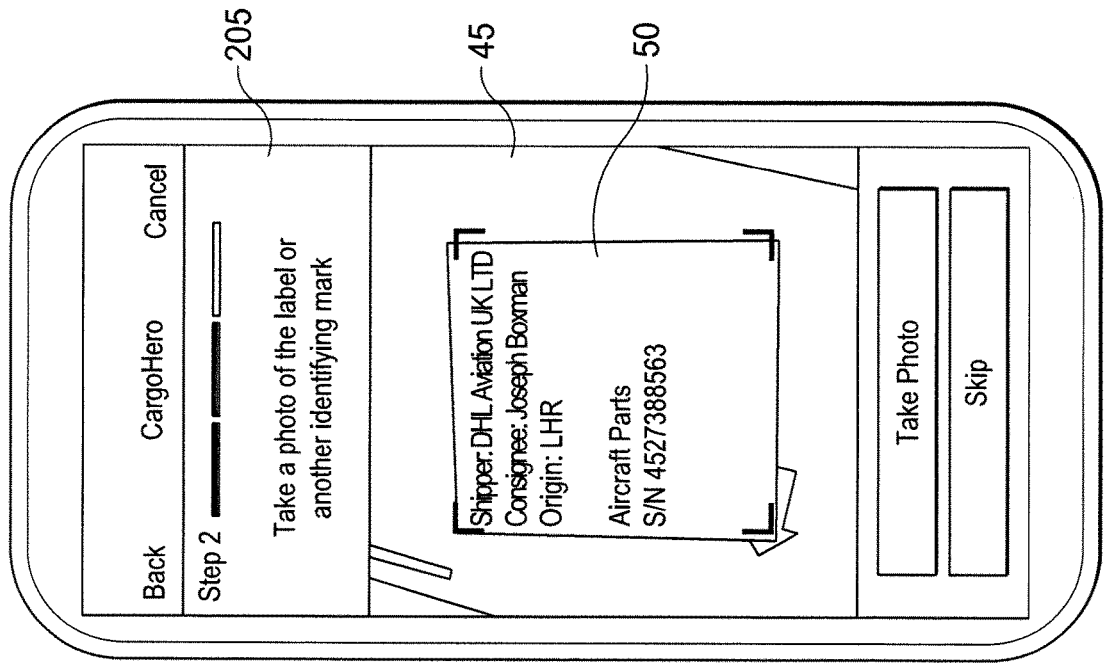
FIG. 5 is an illustration of a window displayed on the GUI of the remote user device of FIG. 1 during another step of the method of FIG. 3, according to an example embodiment.

In an example embodiment and at the step 110, an image of the cargo identifier 50 is generated using the application 25. As illustrated in FIG. 5, the application 25 displays a screen 205 on the GUI 15a of the remote user device 15, with the screen 205 including instructions to take a photo of the cargo identifier 50, a preview of the image, and selectable button that instructs the camera 25g to capture or generate the image. In some embodiments, the application 25 automatically accesses the camera 15g to generate the image in step 110 and displays the screen 205 upon completion of the step 105. Generally, the creation of the image during the step 110 is similar to the creation of the image during the step 105.

Figure 6:
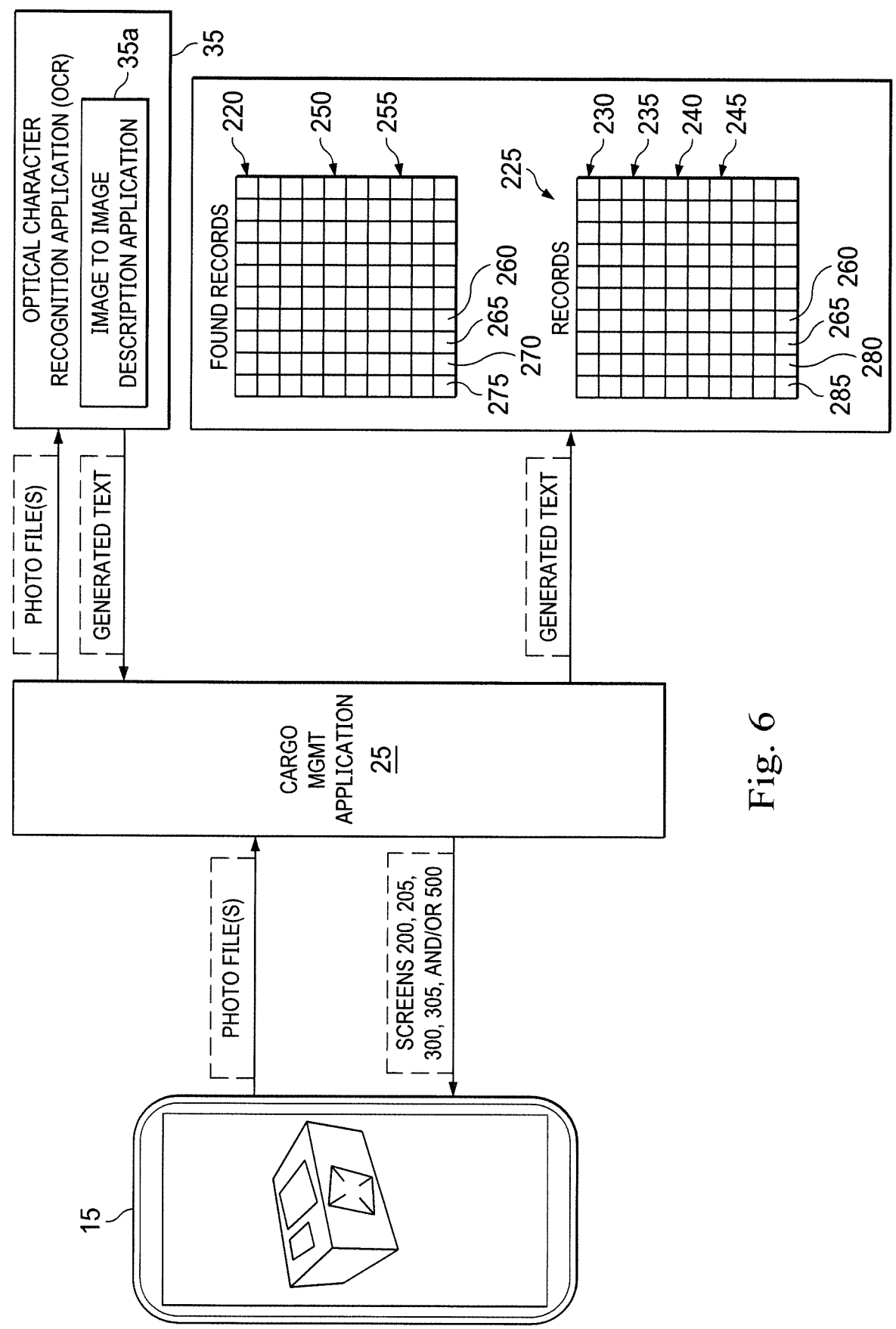
FIG. 6 is a diagrammatic illustration of a data flow of the system of FIG. 1, during step(s) of the method of FIG. 3, according to an example embodiment.

During the step 105 and/or the step 110, the application 25 automatically pushes, via the network 40, the photo file(s) to the database of the computer and/or the OCR application 35. This may be via an application server or directly from the remote user device 15 to the database of the computer 20 and/or the OCR application 35. In some embodiments, prior to pushing the photo file(s), the application 25 compresses the photo file. Upon pushing the photo file(s), the application 25 automatically deletes the photo file from the remote user device 15. That is, the photo file is not stored in the memory of the remote user device 15 or only stored for a brief (i.e., less than 1 minute) time in the memory of the remote user device 15. In some embodiments, the deletion of the photo file(s) is in response to the sending or pushing of the photo file(s) from the remote user device 15. One embodiment of a data flow within the system 10 is illustrated in FIG. 6, which illustrates pushing a compressed photo file from the remote user device 15 to the OCR application 35 via the cargo management application 25. The compressed file photo is stored in the database of the computer 20, one of the plurality of data sources 30, and/or the OCR application 35. In some embodiments, the application 25 or the application 35 accesses the compressed photo file from the database of the computer 20 and/or the third party storage (i.e., the cloud).

In an example embodiment and at the step 115, the OCR application 35 generates text using the image(s). In some embodiments, the OCR application 35 generates text that describes the image of the cargo 45. For example, and referring to the image preview illustrated in FIG. 4, the image to image-description application 35a may generate text such as "brown box", "prime pantry box", etc. based on the image depicted in the image preview. In some embodiments, the OCR application 35 generates text by extracting or recognizing any text within the image and converts the text within the image to a JSON or other computer readable text. In some embodiments, the OCR application 35 recognizes text that forms a portion of the cargo identifier 50. In some embodiments, the OCR application 35 may generate or extract the text in an array such that the text itself is extracted and the positioning of the text relative to surrounding text is preserved. In some embodiments, the text extracted by the OCR application 35 has all of the values in a string format. For example and referring to the image preview illustrated in FIG. 5, the OCR application 35 generates or extracts the following array: "Shipper: DHL Aviation UK LTD\nConsignee: Joseph Boxman\nOrigin: LHR\nAircraft Parts\S/N 4527388563\n". In some embodiments, the extracted text is the found cargo record.

Figure 7:
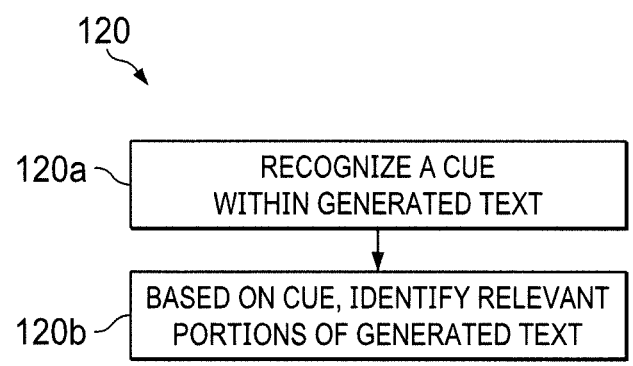
FIG. 7 is a flow chart illustration of a step of the method of FIG. 1, according to an example embodiment.

In an example embodiment and at the step 120, the application 25 processes the text. In some embodiments, the application 25 processes the text generated by the OCR application 35. In some embodiments and as illustrated in FIG. 7, the step 120 includes recognizing a cue within the generated text at step 120a and identifying relevant portions of the generated text based on the cue at step 120b.

In some embodiments and at the step 120a, the application 25 recognizes a cue within the generated text. In some embodiments, the cue is a classifier or descriptor of portions of the generated text. For example, and when the generated text is "Shipper: DHL Aviation UK LTD", then the cue is a prefix of "Shipper:", which indicates that the suffix, "DHL Aviation UK LTD", is the shipper of the cargo 45. Moreover, and when the generated text is "Origin: LHR", then the cue is "Origin:", which indicates that LHR is the origination location listed as an airport code. In some embodiments, a three-character airline code is a cue or prefix. For example, when the generated text is: "001-15568906", then the three-character airline code of "001-" is a cue that the following number (e.g., 15568906) is an airwaybill number or other number identifying the cargo transported by the airline associated with the airline code "001". When the cue is formed by a portion of the generated text, the cue can classify or describe other portions of the generated text. In other embodiments, the cue is a pattern formed by the generated text, with the location of text within the pattern classifying the text. For example, when the generated text is 7512123456, then position of the three numbers "512" that follow the number "7" may indicate that the numbers "512" are associated with an airline code and the position of the last six numbers, "123456" indicate that the numbers "123456" are associated with a baggage number.

In some embodiments and at the step 120b, the application 25 identifies relevant portions of text based on the cue. In some embodiments, the relevant portions of text are portions of text that are specific to the cargo 45. For example and when the generated text is "Origin: LHR" and the cue is "Origin:", the portion of the text specific to the cargo 45 is "LHR". That is, the cue is a classifier that is generic to cargo. That is, all pieces of cargo have an origination location, but not all have the origination location of LHR. Thus, the text of "LHR" is a relevant portion of text that is identified based on the cue. In some embodiments, the relevant portions of text aid in the identification of the cargo 45 and the travel route of the cargo 45. In some embodiments, all text that is not relevant portions of the text is non-relevant text and is omitted from the found cargo record and/or not saved to the computer 20.

In an example embodiment and at the step 125, the application 25 creates a found cargo record for the found cargo 45. Generally, the found cargo record includes one or more record fields associated with an origination location, a shipper of the cargo, a company name, a consignee, a final destination or destination location, a recipient of the cargo, a travel route associated with the cargo, size of the cargo, departure date from origination location, expected arrival date/time for the final destination, a visual characteristic or description (e.g., color, shape) of the cargo, a tracking number such as an airway bill number, a location at which the cargo has been found, and a location at which the cargo will be placed after being found. Generally, the found cargo record is stored in the computer 20, but in other embodiments the found cargo record is stored in one of the plurality of data sources 30. In some embodiments, each of the record fields is configured to store processed text or generated text associated with the cargo 45.

Figure 8:
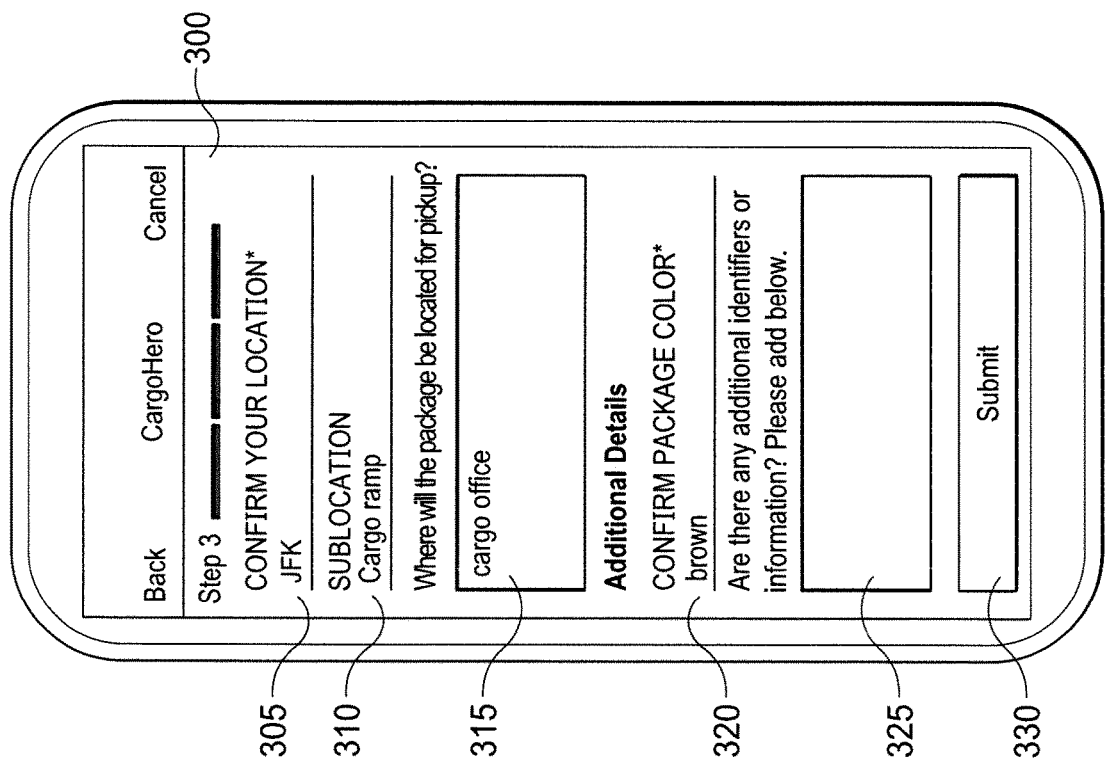
FIG. 8 is an illustration of a window displayed on the GUI of the remote user device of FIG. 1 during yet another step of the method of FIG. 3, according to an example embodiment.

In some embodiments and at the step 130, the application 25 associates text with one or more record fields of the found cargo record. In some embodiments, the associated text is at least a portion of the processed text or generated text associated with the cargo 45. In some embodiments, the application 25 displays all, or a portion of, the associated text to the user for confirmation. For example and as illustrated in FIG. 8, the application 25 displays a screen 300 that includes a location entry element 305, a sublocation entry element 310, a pickup entry element 315, a package detail entry element 320, and an additional details entry element 325. Each of the entry elements may be or include a text box configured to receive text, a drop-down menu, or other element configured to receive data via a screen.

In some embodiments, the location entry element 305 is configured to receive a general location of the found cargo 45. In some embodiments, the location entry element 305 is associated with a "found location" record field of the found cargo record. In some embodiments, the general location of the found cargo is an airport identifier, such as "JFK" as illustrated. However, the general location of the found cargo is not limited to airport identifiers and can include abbreviations or extended names of other locations or places of interest.

In some embodiments, the sublocation entry element 310 is a more detailed description, compared to the location entry element, of the location of the found cargo 45. For example and as illustrated, the sublocation may include any identifiable sublocation within the general location. In some embodiments, the sublocation entry element 310 is associated with a "found sublocation" record field of the found cargo record.

In some embodiments, the pickup entry element 315 includes a description of where the package will be placed while awaiting pick-up. In some embodiments, the pickup entry element 315 is associated with a "pickup location" record field of the found cargo record.

In some embodiments, the package detail entry element 320 receives a description of the cargo 45. In some embodiments, the package detail entry element 320 is associated with a "package detail" record field of the found cargo record. For example and as illustrated in FIG. 8, the screen 300 displays instructions detailing the type of additional information requested regarding the cargo 45. As illustrated, screen 300 displays instructions for confirmation of the color of the cargo 45, with text of "brown" located within the entry element 320. In some embodiments, the screen 300 requests for confirmation of the color, shape, or other identifying characteristic of the cargo 45.

In some embodiments, the additional details entry element 325 receives additional information regarding the cargo 45. In some embodiments, the additional detail entry element 325 is associated with an "additional detail" record field of the found cargo record. For example, the additional details entry element may receive information regarding a type of packaging used (e.g., Amazon package or other brand identifier of the container, type/brand of luggage, originator indicator such as a brand associated with the origination location).

In some embodiments and during the step 130, the application 25 associates text with one or more of the record fields of the found cargo record, such as any one or more of the location entry element 305, the sublocation entry element 310, the pickup entry element 315, the package detail entry element 320, and the additional details entry element 325. In some embodiments, the application 25 pre-populates the entry elements 305, 310, 315, 320, and/or 325 using the processed text from the step 120b, the generated text from the step 115, location data of the remote user device 15, and/or using data from the plurality of data sources 30. For example, in some embodiments the location of "JFK" is prepopulated in the general location entry element 305 based on the location data, which includes a GPS location of the remote user device 15 and/or GPS related metadata embedded in the photo file(s). In some embodiments and as illustrated, the application 25 pre-populates the package detail entry element 320 with the description "brown" based on the text generated via the image to image-description application 35a. In some embodiments, the application 25 pre-populates the pickup entry element 315 with a suggested pick-up location based on the location data and/or the texted within the sublocation entry element 310.

In some embodiments and at the step 135, the application 25 revises the text based on inputs provided by the user via the screen 300. For example, when the location entry element 305 and/or the sublocation entry element 310 are pre-populated by the application 25, the user is still capable of changing and/or adding text within the elements.

In some embodiment and at the step 140, the application 25 assigns the revised text to one or more record fields of the found cargo record. In some embodiments, the screen 300 includes a selectable submit button 330. Generally, when the application 25 receives an indication that the selectable button 330 has been selected, then the text within the entry elements 305, 310, 315, 320, and 325 are assigned into the respective record fields of the found cargo record.

In an example embodiment and at the step 145, the application 25 determines whether the found cargo record matches an existing cargo record. For example and as referring back to FIG. 6, the system 10 searches all existing cargo records to determine whether any of the text associated with the found cargo record matches text associated with an existing cargo record. In some embodiments, the application 25 compares the found cargo record, illustrated as found cargo record 220 in FIG. 6, with a listing of existing cargo records 225. In some embodiments, the listing of existing cargo records 225 includes one or more missing cargo records 230 and 235, which are records of cargo that have been reported as missing, and/or one or more airway bill records or other records 240 and 245. In some embodiments, the found cargo record 220 is one of a plurality of found cargo records including found cargo records 250 and 255. In some embodiments, each of the cargo records 230, 235, 240, 245, 250, and 255 include one or more record fields, such as record fields 260 and 265. In some embodiments, the found cargo records 220, 250, and 255 also include record fields 270 and 275, while the cargo records 230, 235, 240, and 245 include record fields 280 and 285 that are different from the record fields 270 and 275. In some embodiments, the application 25 calculates a percent matched with an existing cargo record. In some embodiments, a found cargo record is a 70% match with an existing cargo record when the destination location and the shipper of both records match. In some embodiments, a found cargo record is an 85% match with an existing cargo record when the origination location, the consignee, and the shipper of both records match. In some embodiments, a found cargo record is a 100% match with an existing electronic record when the origination location, destination location or final destination, and airway bill number or identification number of both records match. In other embodiments, the system 10 searches a database listing all missing cargo. In some embodiments, a matching algorithm is used to determine whether the found cargo record matches with an existing cargo record. In some embodiments and during the step 145, if an airway bill number is within the generated text, then the application 25 considers the cargo 45 to be a 100% match to cargo associated with the airway bill number in the airway bill database. In some embodiments, the following weights are assigned when determining the percentage of a match: up to 70% for company name; 15% to origination location; and 15% to final destination for a total of 100%. Regarding the up to 70% for company name, if the whole company name matches, then the company name is weighted 70%, if the whole company name does not match, then the application 25 assigns up to 60% for the company name, with 70% of 60% provided if the first word of the company name matches, with 20% of 60% provided if the second word matches, and with 8% of 60% provided if the third word matches. In some embodiments, the found cargo record is considered matched if the percentage is 70% or greater. In some embodiments and when more the found cargo record matches with more than one existing cargo record, then the application 35 requests additional information from the user or presents a plurality of records to the user for his or her selection.

Figure 9:
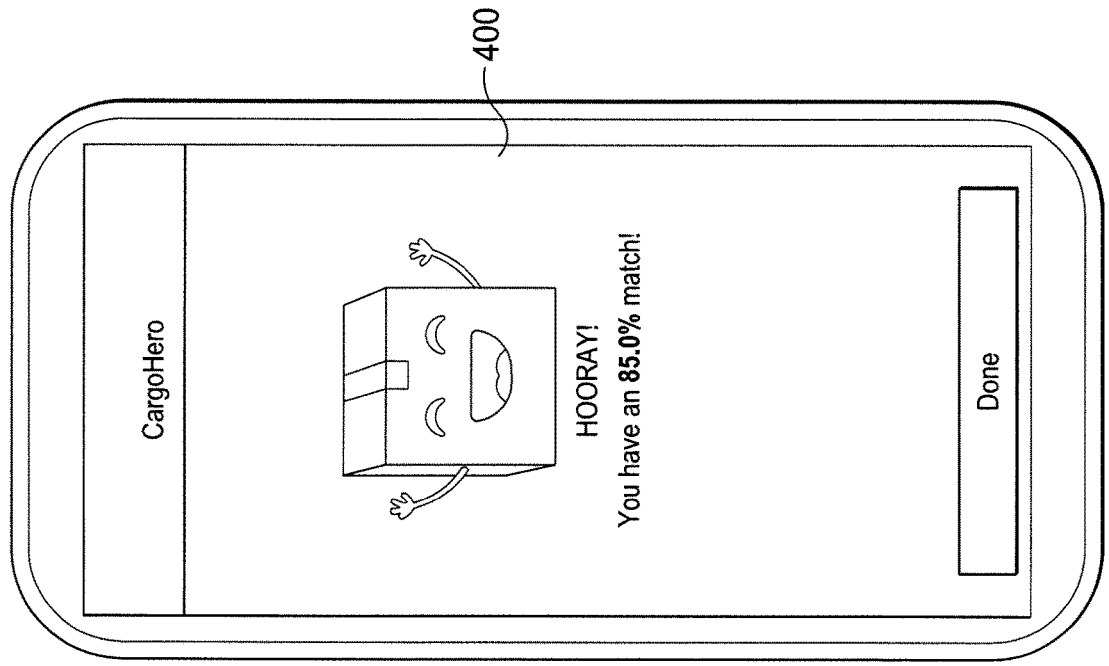
FIG. 9 is an illustration of a window displayed on the GUI of the remote user device of FIG. 1 during yet another step of the method of FIG. 3, according to an example embodiment.
Figure 10:
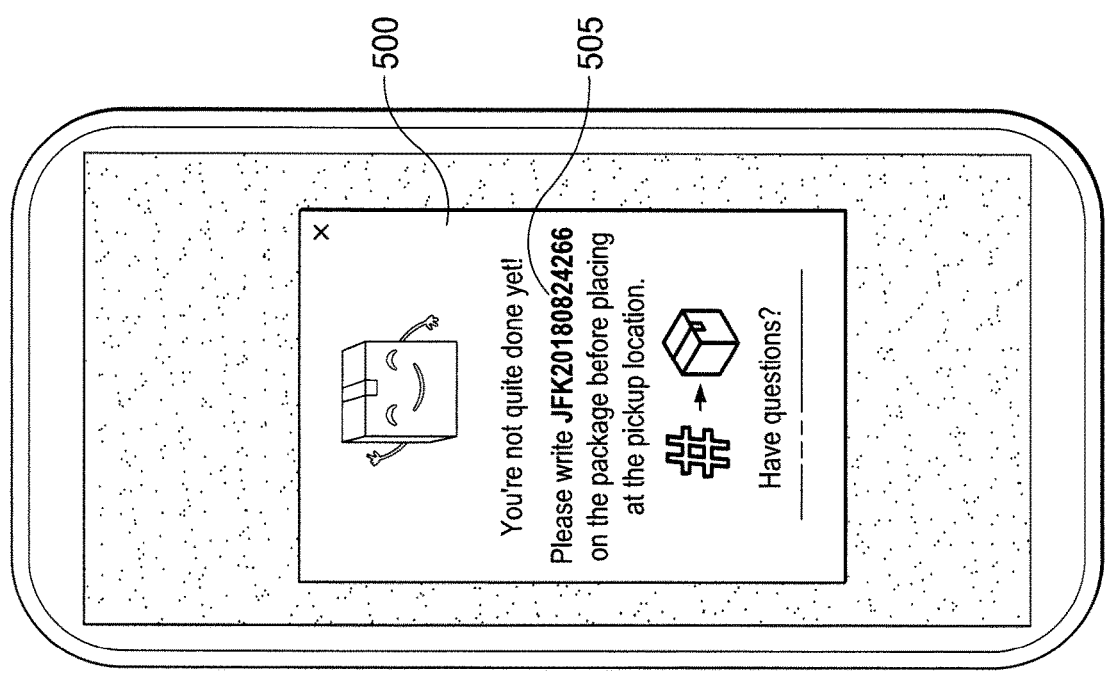
FIG. 10 is an illustration of a window displayed on the GUI of the remote user device of FIG. 1 during yet another step of the method of FIG. 3, according to an example embodiment.

At the step 150 and when there is a match at step 145, the application 25 provides a unique identifier to the user. In some embodiments and as illustrates in FIG. 9, the application 25 displays a screen 400 on the GUI 15*a* that provides an indication that the found cargo has been matched (or at least partially matched). For example, the screen 400 may indicate that the found cargo record has an 85% match with an existing cargo record. In some embodiments and as illustrated in FIG. 10, the application 25 displays a screen 500 on the GUI 15*a* with a unique identifier 505 and instructions for the user to write the unique identifier 505 on the cargo 45 before placing it at the pickup location. In some embodiments, the system 10 and/or the application 25 sends an email notification to a team or person to notify the team or person of the found and matched cargo. Moreover, the application 25 classifies or labels the found cargo record as found and matched when the found cargo record matches with an existing cargo record. In some embodiments and when the found cargo record is matched with a missing cargo record, the missing cargo record is also updated to indicate that the missing cargo has been identified.

At the step 155 and when there is not a match at step 145, then the application 25 saves the found cargo record. In some embodiments, the found cargo record is classified or labeled as found and unmatched and joins a listing of found and unmatched records.

In some embodiments, each or at least a portion of the record fields of the found cargo records and the existing cargo records are text-searchable.

In some embodiments, the system 10 and/or the method 100 assists with the identification of cargo that does not have a legible cargo identifier 50, such as a lot label. In some embodiments, the system 10 and/or the method 100 stores specific information in record fields of the found cargo record so that there is control over the quality of the data submitted regarding found and/or lost cargo, increased traceability regarding the location and condition of found cargo, and increased matching of the found cargo to the missing cargo due to improved data management and increased reporting. In some embodiments, the application 25 is an application that a wide variety of users are capable of downloading on his or her remote user device and using quickly. In some embodiments, the application 25 increases the speed at which missing cargo is found. Thus, the system 10 and/or the method 100 involves a practical application in which the technical field of cargo management is improved.

Generally, the system 10 and/or the method can be altered in a variety of ways. For example, the system 10 and/or the method 100 is not limited to the identification of cargo. Instead, the system 10 and/or the method 100 can identify any lost or unidentified items. For example, lost and found items that are not shipped or otherwise transported can be identified and matched using the system 10. In some embodiments, the image of the cargo identifier is not required by the application to identify the lost item.

In some embodiments, the application 25 uses a matching algorithm(s) to match the found cargo records with existing cargo records, and the matching algorithm(s) are capable of being refined based on feedback from past matches of found cargo records. In some embodiments, the application 25 can identify patterns in lost cargo and troubleshoot as to why each of the cargo was misplaced or lost. As such, the application 25 is capable of service failure trend analysis and results in increased data analytics.

Moreover, in some embodiments and when there is a match at the step 145, the found cargo record is not saved and classified as found and matched. Instead, the system 10 updates the missing cargo record to reflect that the missing cargo associated with the missing cargo record has been found or otherwise notes on the existing cargo record that the cargo has been found.

Moreover, and in some embodiments, the camera 15*g* is a depth perception camera, an augmented reality ("AR") camera, or a camera that is otherwise configured to estimate dimensions and depths of an object. In this embodiment, the application 25, using the depth perception camera, estimates or measures the size of the cargo 45 and the estimated or measured size of the cargo 45 is stored in the found cargo record. In this embodiment, and during the step 105, estimated dimension lines may be illustrated on the screen 200.

In one embodiment, the metadata of the photo file(s) is secure, such that the metadata (or a portion thereof) cannot be edited by the user of the remote user device 15. The photo file is easily traceable and provides a data trail providing authenticity of the time, location, user, and/or date on which the image was taken.

Using conventional methods, a photo is generated using a traditional camera or even a smartphone. When using a traditional camera, the photo is then uploaded onto a local computer using a specific file and requiring specific software, such as .jpg file and .jpg file viewing software. A user must then save the uploaded photo in a .jpg format (or other format) in a certain location within the local computer or using a specific name used to later identify the photo. A copy of the photo is then sent, via email or upload, to a second location, such as the computer 20 and/or the database that includes the listing of found cargo records, for processing or viewing. When using a smartphone, the user of the smartphone must generally email, text, or otherwise upload the photo to the computer 20 and/or the database that includes the listing of found cargo records. This method of uploading a picture using conventional methods does not automatically record which user took the photo and does not accurately and consistently record the time and date on which the photo was taken. Moreover, the photo is retained on the smart phone and/or the local computer even after a copy is sent or uploaded to the second location. Thus, the storage of the photo on the smart phone and/or the local computer requires the use of memory of the smart phone and/or the local computer, which reduces the unused memory available in the smart phone and/or the local computer and can reduce the processing speed of the smart phone and/or the local computer. Additionally, when the photo is emailed to a second physical location or electronic location (e.g. another user's inbox) a copy of the email including the photo is stored in a server associated with the second physical location thereby reducing the available unused memory of the server at the second physical location. However, using the system 10, the automated collection and storage of the photo file to the "cloud" or to the database of the computer 20 (directly from the remote user device 15) avoids the storage of the photo file in the remote user device 15, thereby improving the functioning of each of the remote user device 15 by increasing the unused memory available in the remote user device 15. Moreover, the automated collection and storage of the photo file to the "cloud" or the database of the computer 20 (directly from the remote user device 15) avoids the use of emailing or uploading the photo file and associated storage of the email and photo file in the remote user device 15, thereby improving the functioning of the remote user device 15 by increasing the unused memory available in the remote user device 15.

In some embodiments, the steps 120a and 120b improves the functioning of the computer 20 by increasing the unused memory available in the computer 20. Storage of the entirety of the generated text requires the use of memory of the computer 20 and/or other computer system in which the found cargo record is stored, which reduces the unused memory available in the computer 20 and can reduce the processing speed of the computer 20. With the method 100, the selection and storage of a portion (i.e., the relevant text) of the generated text reduces the memory requirement of the computer 20. In some embodiments, instead of storing the entirety of the generated text, the computer 20 only stores the relevant portions thereby reducing the memory requirement of the computer 20 and increasing the unused memory available in the computer 20.

In an example embodiment of the system 10, when a photo file is created using the remote user device 15, the photo file is not stored in the memory of the remote user device 15, as the photo file is automatically uploaded to the database of the computer 20 or the "cloud" (e.g., the third party storage) directly via the application 25. Thus, the system 10 improves the functioning of the remote user device 15 itself because the photo file is not stored in the memory of the remote user device 15.

In some embodiments, each user logs into the application 25 via a user identifier (e.g., login name) and a user identifier authenticator (e.g., password) such that the system 10 identifies the user of the application 25 and tracks the activity of the user within the application 25. In some embodiments, the application 25 provides different rewards and incentives to the user for reporting lost cargo. That is, the system 10 can be used to gamify the process of reporting and matching found and lost cargo.

Figure 11:
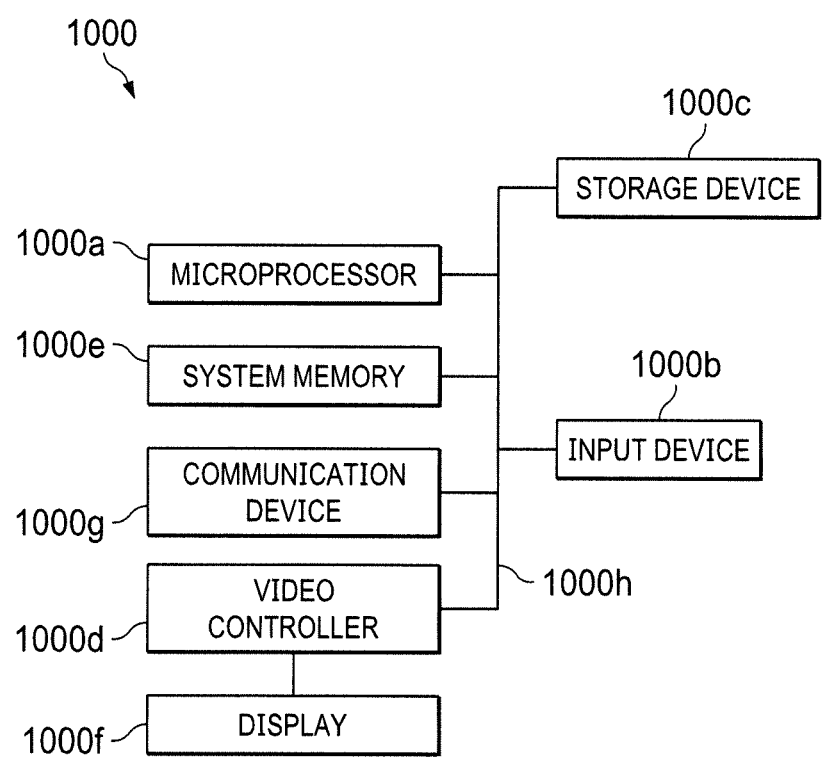
FIG. 11 is a diagrammatic illustration of a node for implementing one or more example embodiments of the present disclosure, according to an example embodiment.

In an example embodiment, as illustrated in FIG. 11 with continuing reference to FIGS. 1-10, an illustrative node 1000 for implementing one or more of the example embodiments described above and/or illustrated in FIGS. 1-10 is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several example embodiments, the storage device 1000c may include a floppy drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones.

In several example embodiments, one or more of the components of the systems described above and/or illustrated in FIGS. 1-10 include at least the node 1000 and/or components thereof, and/or one or more nodes that are substantially similar to the node 1000 and/or components thereof. In several example embodiments, one or more of the above-described components of the node 1000, the system 10, and/or the example embodiments described above and/or illustrated in FIGS. 1-10 include respective pluralities of same components.

In several example embodiments, one or more of the applications, systems, and application programs described above and/or illustrated in FIGS. 1-10 include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

In several example embodiments, a plurality of instructions stored on the computer readable medium is executed by the processor to cause the processor to carry out or implement in whole or in part the above-described operation of each of the above-described example embodiments of the system, the method, and/or any combination thereof.

In one aspect, the disclosure provides an apparatus for matching a found item record with an existing item record, the apparatus comprising: a non-transitory computer readable medium having stored thereon a plurality of instructions, wherein the instructions are executed with at least one processor so that the following steps are executed: displaying, on a graphical user interface ("GUI") of a remote user device, a preview of a first image to be captured by a camera of the remote user device; capturing the first image using the camera of the remote user device, wherein the first image is an image depicting an item; pushing the first image to an optical character recognition and image to image-description application; converting the first image to computer readable text using the optical character recognition and image to image-description application; populating record field(s) of the found item record using at least a portion of the computer readable text; displaying, on the GUI of the remote user device, at least a portion of the populated record field(s) of the found item record; matching, using the populated record field(s), the found item record to the existing item record; and displaying, on the GUI of the remote user device and in response to the matching of the found item record to the existing item record, an identification number associated with the item. In one embodiment, the at least a portion of the computer readable text is text describing any one or more of a color of the item; a location of the item; an origination location associated with the item; a destination location associated with the item; a shipper of the item; and an intended recipient of the item. In one embodiment, the instructions are executed with the at least one processor so that the following step is also executed: receiving, via the GUI, revisions to the at least a portion of the computer readable text. In one embodiment, the instructions are executed with the at least one processor so that the following steps are also executed: pushing the first image to the optical character recognition and image to image-description application; and automatically deleting the first image from the remote user device upon pushing the first image to the optical character recognition and image to image-description application. In one embodiment, the instructions are executed with the at least one processor so that the following steps are also executed: identifying a cue within the computer readable text; and identifying a relevant portion of the computer readable text based on the cue; wherein the at least a portion of the computer readable text is the relevant portion of the computer readable text. In one embodiment, the instructions are executed with the at least one processor so that the following steps are also executed: identifying, based on the cue, a non-relevant portion of the computer readable text; and omitting the non-relevant portion of the computer readable text from the found item record; wherein the non-relevant portion of the computer readable text is different from the relevant portion of the computer readable text. In one embodiment, the computer readable text is text describing an appearance of the item; wherein the instructions are executed with the at least one processor so that the following steps are also executed: displaying, on the GUI of the remote user device, a preview of a second image to be captured by the camera of the remote user device; capturing the second image using the camera of remote user device, wherein the second image is an image of text displayed on the item; pushing the second image to the optical character recognition and image to image-description application; converting the image of the text displayed on the item to additional computer readable text using the optical character recognition and image to image-description application; and populating the record field(s) of the found item record using at least a portion of the additional computer readable text. In one embodiment, the item is a piece of cargo that is associated with a travel route. In one embodiment, the record field(s) of the found item record comprises a general location record field; wherein the instructions are executed with the at least one processor so that the following steps are also executed: receiving, from the remote user device, location data associated with the remote user device; generating, based on the location data, text describing a location of the item; and prepopulating the general location record field with the text describing the location of the item.

In another aspect, the disclosure provides a method of generating an electronic record comprising a plurality of record fields for a found item, the method comprising: receiving, by one or more processors and from a remote user device, photo file(s) each comprising an image depicting the found item; generating, based on one image and using an image to image-description application, text describing a visual characteristic of the found item; and storing the generated text describing the visual characteristic of the found item in a first record field from the plurality of record fields. In one embodiment, the method also includes: extracting computer readable text from another image using an optical character recognition application, wherein the computer readable text provides information regarding the found item; and storing at least a portion of computer readable text in a second record field from the plurality of record fields. In one embodiment, the method also includes: identifying a cue within the computer readable text; and identifying, based on the cue, a relevant portion of the computer readable text; wherein the at least a portion of the computer readable text in the second record field is the relevant portion of the computer readable text. In one embodiment, the method also includes: identifying, based on the cue, a non-relevant portion of the computer readable text; and omitting the non-relevant portion of the computer readable text from the electronic record; wherein the non-relevant portion of the computer readable text is different from the relevant portion of the computer readable text. In one embodiment, the method also includes: comparing the text within the first record field with text of the electronic record within a first record field in an existing item record; classifying the found item as "matched" when the text within the first record field of the electronic record matches the text within the first record field in the existing item record; and classifying the found item as "unmatched" when the text within the first record field of the electronic record does not match the text within the first record field in the existing item record. In one embodiment, the first record field is associated with a color of the found item. In one embodiment, the method also includes: generating, by the remote user device, the photo file(s) depicting the found item; and automatically deleting, using an application, the photo file(s) from the remote user device upon pushing the photo file(s) to the one or more processors. In one embodiment, the method also includes: receiving, by the one or more processors and from the remote user device, location data associated with the remote user device; generating, based on the location data, text describing a location of the found item; and storing the location of the found item in a third record field from the plurality of record fields In one embodiment, the method also includes: generating, based on the location data, text describing a drop-off location for the found item; and storing the drop-off location for the found item in a fourth record field from the plurality of record fields. In one embodiment, the method also includes: extracting, based on another image that depicts text displayed on the found item and using an optical character recognition application, computer readable text associated with the found item; and storing the extracted text in a second record field from the plurality of record fields. In one embodiment, the found item is a piece of cargo that is associated with a travel route; and wherein the computer readable text associated with the found item comprises information regarding the travel route.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes and/or procedures may be merged into one or more steps, processes and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A, B, or both A and B." The phrase "one or more of the following: A, B, and C" should be understood to mean "A, B, C, A and B, B and C, A and C, or all three of A, B, and C." The phrase "one or more of A, B, and C" should be understood to mean "A, B, C, A and B, B and C, A and C, or all three of A, B, and C."

Although several example embodiments have been described in detail above, the embodiments described are example only and are not limiting, and those skilled in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. An apparatus for matching a found item record with an existing item record, the apparatus comprising:
    a non-transitory computer readable medium having stored thereon a plurality of instructions, wherein the instructions are executed with at least one processor so that the following steps are executed:
        displaying, on a graphical user interface ("GUI") of a remote user device, a preview of a first image to be captured by a camera of the remote user device;
        capturing the first image using the camera of the remote user device, wherein the first image is an image depicting an item;
        pushing the first image to an optical character recognition and image to image-description application;
        converting the first image to computer readable text using the optical character recognition and image to image-description application;
            wherein the computer readable text is text describing an appearance of the item;
        populating record field(s) of the found item record using at least a portion of the computer readable text;
        displaying, on the GUI of the remote user device, at least a portion of the populated record field(s) of the found item record;
        matching, using the populated record field(s), the found item record to the existing item record;
        displaying, on the GUI of the remote user device and in response to the matching of the found item record to the existing item record, an identification number associated with the item;
        displaying, on the GUI of the remote user device, a preview of a second image to be captured by the camera of the remote user device;
        capturing the second image using the camera of remote user device, wherein the second image is an image of text displayed on the item;
        pushing the second image to the optical character recognition and image to image-description application;
        converting the image of the text displayed on the item to additional computer readable text using the optical character recognition and image to image-description application; and
        populating the record field(s) of the found item record using at least a portion of the additional computer readable text.

2. The apparatus of claim 1, wherein the instructions are executed with the at least one processor so that the following step is also executed: receiving, via the GUI, revisions to the at least a portion of the computer readable text.

3. The apparatus of claim 1, wherein the instructions are executed with the at least one processor so that the following steps is also executed:
    automatically deleting the first image from the remote user device upon pushing the first image to the optical character recognition and image to image-description application.

4. The apparatus of claim 1, wherein the instructions are executed with the at least one processor so that the following steps are also executed:
    identifying a cue within the computer readable text; and
    identifying a relevant portion of the computer readable text based on the cue;
    wherein the at least a portion of the computer readable text is the relevant portion of the computer readable text.

5. The apparatus of claim 4, wherein the instructions are executed with the at least one processor so that the following steps are also executed:
    identifying, based on the cue, a non-relevant portion of the computer readable text; and
    omitting the non-relevant portion of the computer readable text from the found item record;
    wherein the non-relevant portion of the computer readable text is different from the relevant portion of the computer readable text.

6. The apparatus of claim 1, wherein the item is a piece of cargo that is associated with a travel route.

7. An apparatus for matching a found item record with an existing item record, the apparatus comprising:
    a non-transitory computer readable medium having stored thereon a plurality of instructions, wherein the instructions are executed with at least one processor so that the following steps are executed:
        displaying, on a graphical user interface ("GUI") of a remote user device, a preview of a first image to be captured by a camera of the remote user device;
        capturing the first image using the camera of the remote user device, wherein the first image is an image depicting an item;
        pushing the first image to an optical character recognition and image to image-description application;
        converting the first image to computer readable text using the optical character recognition and image to image-description application;
        populating record field(s) of the found item record using at least a portion of the computer readable text;
        displaying, on the GUI of the remote user device, at least a portion of the populated record field(s) of the found item record;
        matching, using the populated record field(s), the found item record to the existing item record;
        displaying, on the GUI of the remote user device and in response to the matching of the found item record to the existing item record, an identification number associated with the item;

wherein the record field(s) of the found item record comprises a general location record field;

receiving, from the remote user device, location data associated with the remote user device;

generating, based on the location data, text describing a location of the item; and prepopulating the general location record field with the text describing the location of the item.

8. The apparatus of claim 7, wherein the at least a portion of the computer readable text is text describing any one or more of a color of the item; a location of the item; an origination location associated with the item; a destination location associated with the item; a shipper of the item; and an intended recipient of the item.

9. The apparatus of claim 7, wherein the instructions are executed with the at least one processor so that the following step is also executed: receiving, via the GUI, revisions to the at least a portion of the computer readable text.

10. The apparatus of claim 7, wherein the instructions are executed with the at least one processor so that the following steps is also executed:

automatically deleting the first image from the remote user device upon pushing the first image to the optical character recognition and image to image-description application.

11. The apparatus of claim 7, wherein the instructions are executed with the at least one processor so that the following steps are also executed:

identifying a cue within the computer readable text; and identifying a relevant portion of the computer readable text based on the cue;

wherein the at least a portion of the computer readable text is the relevant portion of the computer readable text.

12. The apparatus of claim 11, wherein the instructions are executed with the at least one processor so that the following steps are also executed:

identifying, based on the cue, a non-relevant portion of the computer readable text; and omitting the non-relevant portion of the computer readable text from the found item record;

wherein the non-relevant portion of the computer readable text is different from the relevant portion of the computer readable text.

13. The apparatus of claim 7, wherein the item is a piece of cargo that is associated with a travel route.

14. A method of generating an electronic record comprising a plurality of record fields for a found item, the method comprising:

receiving, by one or more processors and from a remote user device, photo file(s) each comprising an image depicting the found item;

generating, based on one image and using an image to image-description application, text describing a visual characteristic of the found item;

storing the generated text describing the visual characteristic of the found item in a first record field from the plurality of record fields;

extracting, based on another image that depicts text displayed on the found item and using an optical character recognition application, computer readable text associated with the found item; and storing the extracted text in a second record field from the plurality of record fields.

15. The method of claim 14, further comprising:

identifying a cue within the computer readable text; and identifying, based on the cue, a relevant portion of the computer readable text;

wherein the at least a portion of the computer readable text in the second record field is the relevant portion of the computer readable text.

16. The method of claim 15, further comprising:

identifying, based on the cue, a non-relevant portion of the computer readable text; and omitting the non-relevant portion of the computer readable text from the electronic record;

wherein the non-relevant portion of the computer readable text is different from the relevant portion of the computer readable text.

17. The method of claim 14, further comprising:

comparing the text within the first record field with text of the electronic record within a first record field in an existing item record;

classifying the found item as "matched" when the text within the first record field of the electronic record matches the text within the first record field in the existing item record; and classifying the found item as "unmatched" when the text within the first record field of the electronic record does not match the text within the first record field in the existing item record.

18. The method of claim 14, wherein the first record field is associated with a color of the found item.

19. The method of claim 14, further comprising:

generating, by the remote user device, the photo file(s) depicting the found item; and automatically deleting, using an application, the photo file(s) from the remote user device upon pushing the photo file(s) to the one or more processors.

20. The method of claim 14, further comprising:

receiving, by the one or more processors and from the remote user device, location data associated with the remote user device;

generating, based on the location data, text describing a location of the found item; and storing the location of the found item in a third record field from the plurality of record fields.

21. The method of claim 20, further comprising:

generating, based on the location data, text describing a drop-off location for the found item; and storing the drop-off location for the found item in a fourth record field from the plurality of record fields.

22. The method of claim 14, wherein the found item is a piece of cargo that is associated with a travel route; and wherein the computer readable text associated with the found item comprises information regarding the travel route.

* * * * *